US005802890A

United States Patent [19]

Espada-Velasco

[11] Patent Number: 5,802,890

[45] Date of Patent: Sep. 8, 1998

[54] ANTI-THEFT DEVICE APPLICABLE TO CONTAINERS OF ARTICLES

[75] Inventor: Jerónima Espada-Velasco, Barcelona, Spain

[73] Assignee: Activ Protection Systems S.L., Barcelona, Spain

[21] Appl. No.: 855,317

[22] Filed: May 13, 1997

[30] Foreign Application Priority Data

May 14, 1996 [ES] Spain ..................................... 9601077

[51] Int. Cl.[6] ............................ G11B 33/04; B65D 85/57

[52] U.S. Cl. .............................. 70/57.1; 70/276; 206/1.5; 206/308.2; 206/387.11

[58] Field of Search .............................. 70/276, 57.1, 58, 70/63; 206/308.2, 387.11, 1.5

[56] References Cited

U.S. PATENT DOCUMENTS

| | | | |
|---|---|---|---|
| 1,881,511 | 10/1932 | Grierson et al. | 70/276 |
| 3,744,833 | 7/1973 | Berducone | 70/276 X |
| 3,831,986 | 8/1974 | Kobayashi | 70/276 X |
| 4,299,870 | 11/1981 | Humble | 70/57.1 X |
| 5,129,244 | 7/1992 | Wittman | 70/57.1 |
| 5,147,034 | 9/1992 | Broadhead et al. | 206/1.5 |
| 5,368,162 | 11/1994 | Holmgren | 206/1.5 X |
| 5,524,752 | 6/1996 | Mazucchelli | 206/1.5 X |
| 5,588,315 | 12/1996 | Holmgren | 70/57.1 |

FOREIGN PATENT DOCUMENTS

| | | | |
|---|---|---|---|
| WO93/15294 | 8/1993 | WIPO | 70/276 |

*Primary Examiner*—Lloyd A. Gall
*Attorney, Agent, or Firm*—Lackenbach Siegel Marzullo Aronson & Greenspan, P.C.

[57] ABSTRACT

A container of the kind (1) having an area (4) on one of its faces (5) including an articulation line (6) about which it tends to flex in order to provide an opening (3) on an adjacent face to release the contents. Locking device, consisting of a bolt (8), hold the area (4) coplanarly with the face (5) including the same in order to provide a safety closure.

2 Claims, 3 Drawing Sheets

ANTI-THEFT DEVICE APPLICABLE TO CONTAINERS OF ARTICLES

FIELD OF THE INVENTION

The present invention relates to a new anti-theft device applicable to containers of articles which, in addition to the function for which they are designed, afford a number of advantages discussed hereinafter, and others that are inherent in their organisation and construction.

BACKGROUND OF THE INVENTION

Several anti-theft devices are currently known which are applied to cases or containers consisting of a substantially flattened box made of a moulded material, for instance transparent plastic, which enclosure is designed to house the object to be protected snugly, the faces of the container including openings that allow access to said enclosure in order to enable the insertion and removal of the object to be contained.

It is currently well-known to provide the inner container walls with magnetic labels at locations that are not accessible from the outside when the object or contents lie within the cavity or enclosure of said container, which labels are combined with known anti-theft devices installed in the commercial establishments to trigger an acoustic alarm.

In order to prevent the dishonest removal of the object from its respective container, seeking to defeat the aforesaid alarm, means have also been designed to safely secure the contents with respect to the container.

Nowadays, the manner in which the object or contents are secured to the container consists of an axially mobile bolt biased by a spring into the container enclosure, in order to enable it to be inserted in a recess or notch provided on the structure of the object to be packed. In accordance with the foregoing, the object is kept solidly secured to the box or container. Since the bolt cannot be reached from the outside, the only possibility of ousting it from its location is through a sufficiently powerful magnetic field which the shop staff have to hand.

Traditional state-of-the-art devices however have several shortfalls, one of which lies in that they are scarcely reliable, whereas others lie in an excessive cost which render them inadvisable from the economic standpoint.

The little reliability offered by current anti-theft devices is the result of the difficulty of fitting the bolt properly within the cavity of the object that is to be tied to the container. This shortfall enables the packed object to be detached from the packaging or container, and traditional control barriers equipped with alarm means can therefore be negotiated since one of the conjugated means that trigger said alarm, namely the magnetic labels of the container, will be missing.

The current state of the art also offers devices that work with the aforesaid devices, establishing a stop that prevents the outlet of the packed object, which stop is released using electromagnetic means which are complex and therefore raise the costs.

Another arrangement, applicable to parallelepiped containers which have an opening on one of their larger faces for the insertion or removal of the object to be contained, consists of mechanical means biased by a spring towards an operative position in which they press the object against an inner container wall, in order to prevent the removal of said object.

This arrangement, which is exclusively applicable for the frontal removal of the object, is less practical than that which uses a side opening or an opening on the smaller side of the case. Furthermore, the means holding the object pressed comprise manifold parts that are costly to manufacture and assemble, which cost must be taken into account for selling the same.

SUMMARY OF THE INVENTION

The present Patent of Invention relates to a new device applicable to containers of articles, devised to substantially improve its functions and remedy the shortfalls of the current state of the art.

The device referred to is applicable to containers of the kind integrating a casing made of a preferably recyclable plastic material such as polycarbonate, ABS and others, designed to house inside it an article that is to be protected from being thieved, such article being of the kind consisting of a compact-disc, music or video cassette, video game, CD ROM, Soft, gift, costume jewellery, photography items, small electronic appliances, etc., which articles are cited for informative purposes, and should be taken in the broadest sense and not as being restrictive of the scope of the manifold applications to which the invention may be put.

The invention provides for an area of one of the larger faces of the box to be articulated in order to constitute an opening for inserting or removing the article to be packed.

The free edge of the articulated area has a right-angled flap that closes part or all of the box opening, standing as a wall hindering the removal of the packed article.

The said articulated area tends to stay drawn away from the plane of the larger face which contains it, clearing the box opening, ready to receive the article to be packed or have the packed article removed.

The closure flap has a normal wall portion at one end lying at a right angle, provided with a hole or female housing to receive a bolt which crosses through the face of the box, which bolt is biased by a spring or similar resilient means towards its locking position. This bolt is integral with a conventional locking device located outside on the said smaller face of the box adjacent to the box opening, the opening of which device is triggered by means of a unit which generates a magnetic field capable of having the bolt slide axially out of the housing existing on the right-angled wall of the area, in order to release the latter, thereby for the articulated area to flex out due to its natural tendency, clearing the passage into or opening of the box containing the article, which may now be removed, leaving the container empty and ready to accommodate a new article that is to be packed and safely protected from thieving.

A first object of the invention is to attain effective means to secure the article inside the respective container, due to the housing where the bolt is locked being directly obtained in the container structure, which ensures a proper fit, unlike those that exist nowadays, where the locking hole is provided by the article, which used to cause misalignments between the housing and the bolts, resulting in easily severable imperfect anchorages.

A second object of the invention is to successfully simplify the operation to remove the article, in order for dispensing of the articles at the points of sale to be swifter.

Finally, a third object of the invention is to achieve a substantial lowering of the costs, rendering the object of the invention competitive in the market.

The present Patent of Invention offers the advantages described hereinbefore and others that will follow easily from the embodiment of an anti-theft device that is described hereinafter in further detail for an easier understanding of the characteristics set out above, concurrently referring to a number of details, to which end a number of drawings are attached to the present specification which represent a practical embodimnent of the object of the present invention, merely as an example that is not intended to limit the said invention.

DESCRIPTION OF AN EMBODIMENT OF THE INVENTION

Figure 1:
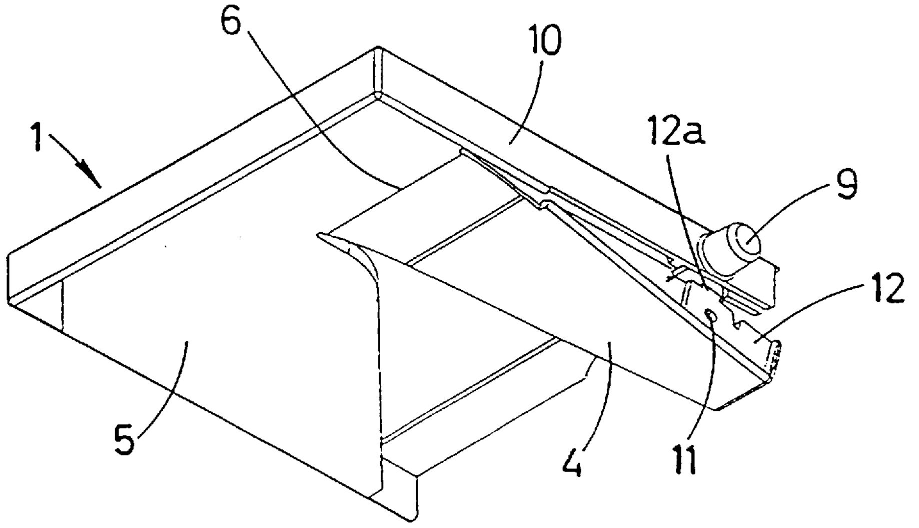
FIGS. 1, 2 and 3 represent perspective views of the container subject of the invention, which is shown open.
Figure 2:
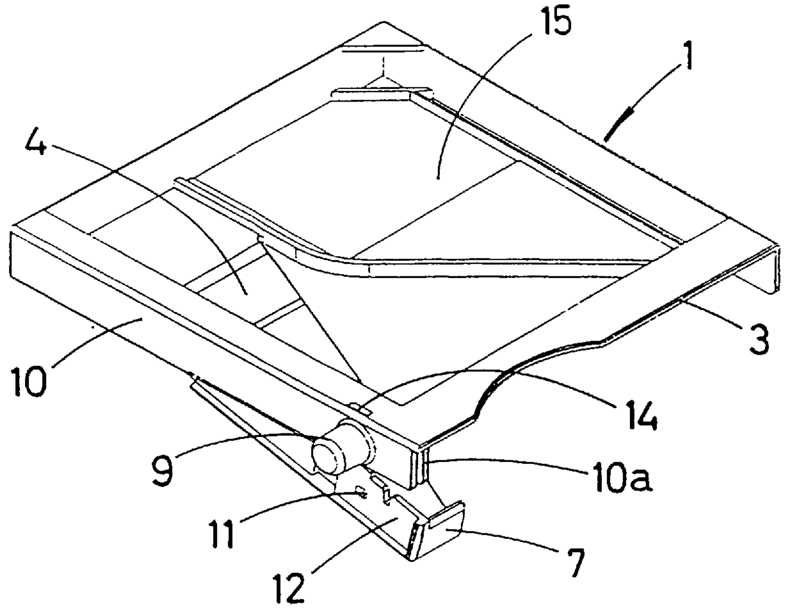
Figure 3:
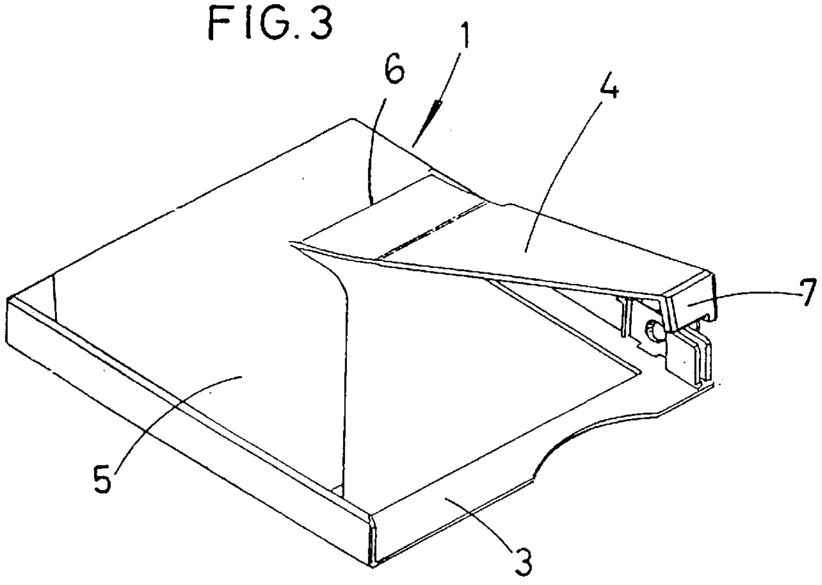
Figure 4:
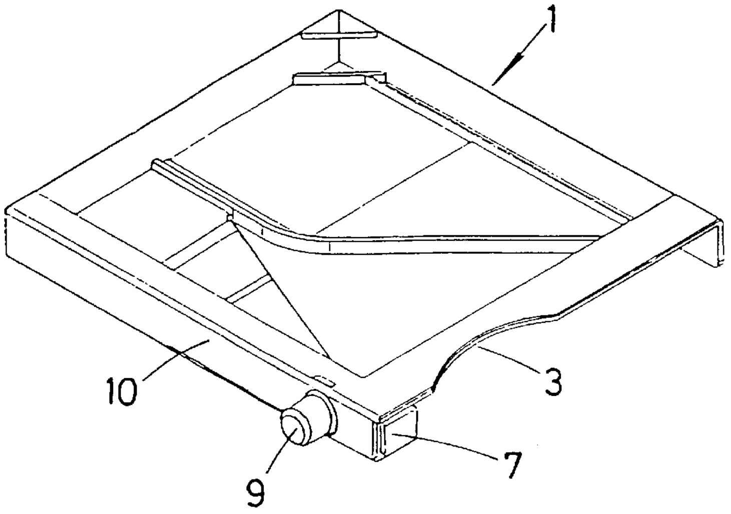
FIG. 4 illustrates the closed container in accordance with a perspective similar to that of FIG. 2.
Figure 5:
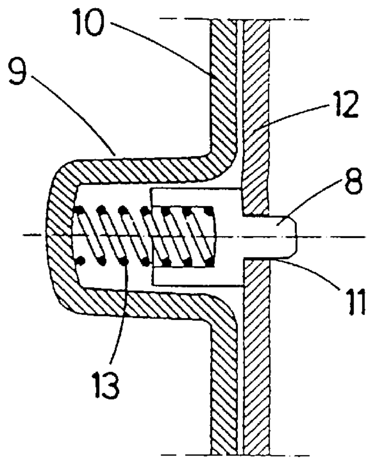
FIG. 5 shows a cross-section of detail "A".
Figure 6:
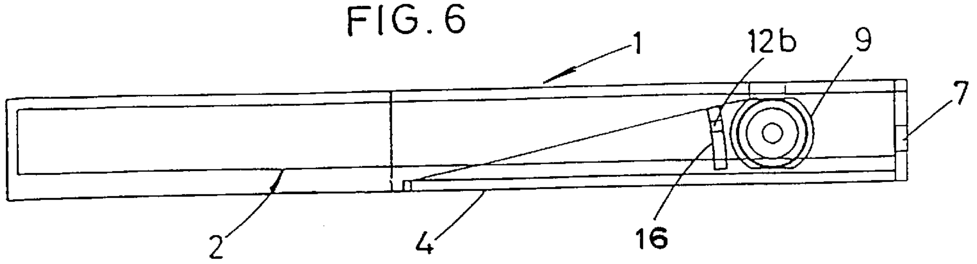
FIGS. 6, 7 and 8 are each side views of the container in respective loading, pre-loading and open or unloading positions of the article.
Figure 7:
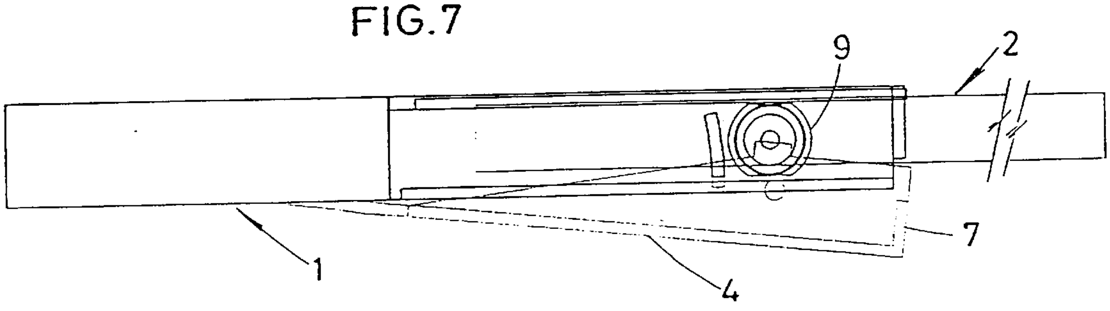
Figure 8:
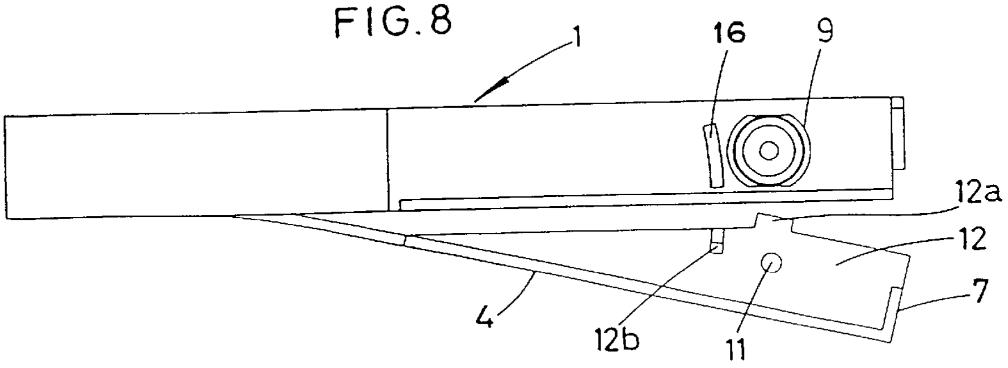

As shown in the drawings, the anti-theft device of the invention, in accordance with an embodiment thereof, is applicable to a container, generally designated -1-, of the kind that is parallelepiped in shape and used to house at least one article, generally designated -2-, wherein the structure of said article or otherwise of the case of said article matches that of the container -1-.

The container -1- traditionally has an opening -3- on one of its smaller sides for the insertion of the article -2- to be housed, which fills the entire cavity of the container.

The improvements subject of the present invention, and described below, have been devised to prevent the article -2- from being stolen.

The device comprises an area -4- relating to one of its larger faces -5- articulated by means of a weakened line -6-, which area tends to lie at a certain angle to the general plane of the face -5-. The free side of said area -4- is provided with a right-angled flap -7- closing part of the box opening -3- to prevent the removal of the packed article, when such area -4- is kept coplanarly with the face -5- by means of a conventional locking device, which comprises a bolt -8- located in a housing -9-outside a smaller face -10- of the box, which bolt crosses through a hole in said smaller face -10- and a second hole -1- provided in a wall -12- lying perpendicular to the flap -7-. This bolt -8- is biased by a spring -13- towards its operative position, and holds the flap -7- in a position in which it blocks the opening -3-.

When the bolt -8- is slid axially contrary to the functional direction by means of a magnetic field generated by a machine which authorised staff have to hand, the aforesaid lock is undone and the area -4- swings to the outside about the line -6- over an angle that suffices with respect to the face -5- to clear the opening -3- and allow the removal of the article -2-.

In the embodiment described, the smaller face -10- is internally provided with a parallel wall -10*a*- having a housing established between the same to receive the wall -12-, which has a projection -12*a*- on its longitudinal edge that is housed in a small opening -14- in the larger face -15- of the box.

In order for the system to be more functional, the wall -12- has a spigot -12*b*- to be guided in a slot -16- on the wall -10-.

In accordance with the description, a dishonest attempt at removing the article -2- from the container -3- would be impossible due to the location of the bolt -8- in the hole -11- of the wall -12-, which holds the flap -7-, closing the opening -3- of the container fully or partially, and yet, upon removing the bolt -8- from its housing -11- by traditional methods, it will be possible to remove the article -2- because the area -4- which contains the blocking flap -7- tends to flex to the outside about the hinge line -6-.

I claim:

1. A new anti-theft device applicable to containers of articles, of the kind comprising a container (1) having a flattened parallelepiped or other shapes, open through one of its smaller faces (3) and having on an adjacent smaller face (10) a bolt (8) that is axially mobile across said face (10), biased by a spring (13) towards a locking position of the article (2) or contents, and released from said locking position by the action of a magnetic field generated by an external machine, essentially characterised in that the container (1) has an area (4) partially or entirely relating to one of its larger faces (5), which area has an articulation line (6) about which it tends to flex to lie at an angle to the general plane of the face (5), a free side of the said area (4) being provided with a right-angled flap (7) which, when the area (4) is situated coplanarly with the face (5), partially or fully closes the opening (3), preventing the removal of the packed article (2), and in which closed position the area (4) is kept locked by means of a conventional device comprising the said bolt (8) located outside the smaller face (10) and inserted in a hole (11) provided in a wall (12) lying perpendicular to the flap (7).

2. A new anti-theft device applicable to containers of articles, as in claim 1, characterised in that the smaller face (10) is internally provided with a parallel wall (10*a*) and a housing is established between the two for the wall (12) which is provided on its edge with a projection (12*a*) to be housed in an opening (14) on another larger face (15) of the container, a spigot existing on such wall (12) guided in a slot (16) of the smaller face (10).

* * * * *